United States Patent
Zhang et al.

(10) Patent No.: US 11,988,773 B2
(45) Date of Patent: May 21, 2024

(54) 2-DIMENSIONAL STEERING SYSTEM FOR LIDAR SYSTEMS

(71) Applicant: Innovusion Ireland Limited, Los Altos, CA (US)

(72) Inventors: Rui Zhang, Los Altos, CA (US); Huitao Sun, Los Altos, CA (US); Zheng Yang, Los Altos, CA (US); Yimin Li, Los Altos, CA (US); Junwei Bao, Los Altos, CA (US)

(73) Assignee: Innovusion, Inc., Sunnyvale, CA (US)

( * ) Notice: Subject to any disclaimer, the term of this patent is extended or adjusted under 35 U.S.C. 154(b) by 1202 days.

(21) Appl. No.: 16/283,568

(22) Filed: Feb. 22, 2019

(65) Prior Publication Data

US 2019/0265336 A1    Aug. 29, 2019

Related U.S. Application Data

(60) Provisional application No. 62/634,661, filed on Feb. 23, 2018.

(51) Int. Cl.
*G01C 3/08* (2006.01)
*G01S 7/481* (2006.01)
(Continued)

(52) U.S. Cl.
CPC .......... *G01S 7/4817* (2013.01); *G01S 7/4818* (2013.01); *G01S 7/484* (2013.01); *G01S 7/4861* (2013.01);
(Continued)

(58) Field of Classification Search
CPC .... G01S 7/4811; G01S 7/4812; G01S 7/4817; G01S 7/4818; G01S 7/483; G01S 7/484;
(Continued)

(56) References Cited

U.S. PATENT DOCUMENTS

| 3,122,330 A | 2/1964 | Trentini |
| 3,854,821 A | 12/1974 | Thompson |

(Continued)

FOREIGN PATENT DOCUMENTS

| CN | 1677050 A | 10/2005 |
| CN | 1946986 A | 4/2007 |

(Continued)

OTHER PUBLICATIONS

Chen, X, et al. (Feb. 2010). "Polarization Coupling of Light and Optoelectronics Devices Based on Periodically Poled Lithium Niobate," Shanghai Jiao Tong University, China, Frontiers in Guided Wave Optics and Optoelectronics, 24 pages.

(Continued)

*Primary Examiner* — Samantha K Nickerson
(74) *Attorney, Agent, or Firm* — MASCHOFF BRENNAN; Liang Huang

(57) ABSTRACT

A light detection and ranging (LiDAR) system includes a rotatable polygon having a plurality of reflective sides including a first reflective side. The rotatable polygon configured to scan one or more first light signals in a first direction. The LiDAR system also includes a scanning optic configured to scan the one or more first light signals in a second direction different than the first direction. A first light source is configured to direct the one or more first light signals to one or more of the plurality of reflective sides of the rotatable polygon or the scanning optic. A first detector is configured to detect a first return light signal associated with a signal of the one or more first light signals. One or more optics are configured to focus the first return light signal on the first detector.

21 Claims, 8 Drawing Sheets

(51) Int. Cl.
*G01S 7/484* (2006.01)
*G01S 7/4861* (2020.01)
*G01S 17/08* (2006.01)
*G02B 26/10* (2006.01)
*G02B 26/12* (2006.01)
*G01S 17/89* (2020.01)

(52) U.S. Cl.
CPC ............ *G01S 17/08* (2013.01); *G02B 26/101* (2013.01); *G02B 26/12* (2013.01); *G01S 17/89* (2013.01)

(58) Field of Classification Search
CPC ........ G01S 7/4861; G01S 7/491; G01S 17/08; G01S 17/89; G01S 7/4815; G01S 17/10; G01S 17/42; G02B 26/08; G02B 26/0816; G02B 26/101; G02B 26/12; G02B 26/105
See application file for complete search history.

(56) References Cited

U.S. PATENT DOCUMENTS

| | | | |
|---|---|---|---|
| 3,897,150 A | | 7/1975 | Bridges et al. |
| 4,412,720 A | | 11/1983 | Costa |
| 4,464,048 A | | 8/1984 | Farlow |
| 4,923,263 A | | 5/1990 | Johnson |
| 5,006,721 A | | 4/1991 | Cameron et al. |
| 5,157,451 A | | 10/1992 | Taboada et al. |
| 5,303,084 A | | 4/1994 | Pflibsen et al. |
| 5,319,434 A | | 6/1994 | Croteau et al. |
| 5,369,661 A | | 11/1994 | Yamaguchi et al. |
| 5,442,358 A | | 8/1995 | Keeler |
| 5,475,207 A | | 12/1995 | Bobba et al. |
| 5,510,890 A | | 4/1996 | Langdon et al. |
| 5,546,188 A | | 8/1996 | Wangler et al. |
| 5,579,153 A | | 11/1996 | Laming et al. |
| 5,600,487 A | | 2/1997 | Kiyomoto et al. |
| 5,614,961 A | | 3/1997 | Gibeau et al. |
| 5,657,077 A | | 8/1997 | Deangelis |
| 5,682,225 A | | 10/1997 | DuBois et al. |
| 5,736,958 A | | 4/1998 | Turpin |
| 5,793,491 A | * | 8/1998 | Wangler .................. G01S 17/89 356/613 |
| 5,838,239 A | | 11/1998 | Stern et al. |
| 5,864,391 A | | 1/1999 | Hosokawa et al. |
| 5,926,259 A | | 7/1999 | Bamberger |
| 5,936,756 A | | 8/1999 | Nakajima |
| 6,163,378 A | | 12/2000 | Khoury |
| 6,175,440 B1 | | 1/2001 | Conemac |
| 6,317,202 B1 | | 11/2001 | Hosokawa et al. |
| 6,361,324 B1 | | 2/2002 | Flint |
| 6,420,698 B1 | | 7/2002 | Dimsdale |
| 6,594,000 B2 | | 7/2003 | Green |
| 6,650,404 B1 | | 11/2003 | Crawford |
| 6,650,407 B2 | | 11/2003 | Jamieson et al. |
| 6,783,074 B1 | | 8/2004 | Hammer |
| 6,788,445 B2 | | 9/2004 | Goldberg et al. |
| 6,864,498 B2 | | 3/2005 | Katzir et al. |
| 6,950,733 B2 | | 9/2005 | Stopczynski |
| 7,128,267 B2 | | 10/2006 | Reichenbach et al. |
| 7,202,941 B2 | | 4/2007 | Munro |
| 7,323,987 B2 | | 1/2008 | Seas et al. |
| 7,345,271 B2 | | 3/2008 | Boehlau et al. |
| 7,382,442 B2 | | 6/2008 | Adachi et al. |
| 7,405,676 B2 | | 7/2008 | Janssen |
| 7,440,084 B2 | | 10/2008 | Kane |
| 7,440,175 B2 | | 10/2008 | Di |
| 7,489,865 B2 | | 2/2009 | Varshneya |
| 7,541,944 B2 | | 6/2009 | Konya et al. |
| 7,544,945 B2 | | 6/2009 | Tan et al. |
| 7,541,943 B2 | | 8/2009 | Manor |
| 7,576,837 B2 | | 8/2009 | Liu |
| 7,580,117 B2 | | 8/2009 | Okada et al. |
| 7,639,347 B2 | | 12/2009 | Eaton |
| 7,675,655 B2 | 3/2010 | Marshall et al. |
| 7,679,798 B2 | 3/2010 | Sowa et al. |
| 7,697,120 B2 | 4/2010 | Reichert et al. |
| 7,830,527 B2 | 11/2010 | Chen |
| 7,835,068 B1 | 11/2010 | Brooks |
| 7,847,235 B2 | 12/2010 | Krupkin |
| 7,869,112 B2 | 1/2011 | Borchers et al. |
| 7,880,865 B2 | 2/2011 | Tanaka et al. |
| 7,936,448 B2 | 5/2011 | Albuquerque |
| 7,969,558 B2 | 6/2011 | Hall |
| 7,982,861 B2 | 7/2011 | Abshire |
| 8,009,186 B2 | 8/2011 | Tomioka |
| 8,072,582 B2 | 12/2011 | Meneely |
| 8,116,968 B2 | 2/2012 | Jou et al. |
| 8,212,998 B2 | 7/2012 | Rindle |
| 8,248,272 B2 | 8/2012 | Arnold et al. |
| 8,299,957 B2 | 10/2012 | Tseng |
| 8,471,895 B2 | 6/2013 | Banks |
| 8,526,473 B2 | 9/2013 | Baird et al. |
| 8,629,977 B2 | 1/2014 | Phillips et al. |
| 8,659,643 B2 | 2/2014 | Purvis et al. |
| 8,659,748 B2 | 2/2014 | Dakin et al. |
| 8,681,319 B2 | 3/2014 | Tanaka et al. |
| 8,736,818 B2 | 5/2014 | Weimer |
| 8,749,764 B2 | 6/2014 | Hsu |
| 8,812,149 B2 | 8/2014 | Doak |
| 8,836,955 B2 | 9/2014 | Diez et al. |
| 8,842,356 B2 | 9/2014 | Sandner et al. |
| 8,918,270 B2 | 12/2014 | Wang |
| 8,976,339 B2 | 3/2015 | Phillips et al. |
| 8,994,928 B2 | 3/2015 | Shiraishi |
| 9,048,616 B1 | 6/2015 | Robinson |
| 9,065,243 B2 | 6/2015 | Asobe et al. |
| 9,086,273 B1 | 7/2015 | Gruver |
| 9,188,674 B2 | 11/2015 | Suzuki et al. |
| 9,194,701 B2 | 11/2015 | Bösch |
| 9,239,959 B1 | 1/2016 | Evans et al. |
| 9,255,790 B2 | 2/2016 | Zhu |
| 9,300,321 B2 | 3/2016 | Zalik |
| 9,304,316 B2 | 4/2016 | Weiss et al. |
| 9,316,724 B2 | 4/2016 | Gehring et al. |
| 9,354,485 B2 | 5/2016 | Fermann |
| 9,476,968 B2 | 10/2016 | Anderson et al. |
| 9,477,007 B2 | 10/2016 | Albert et al. |
| 9,510,505 B2 | 12/2016 | Halloran |
| 9,575,184 B2 | 2/2017 | Gilliland |
| 9,605,998 B2 | 3/2017 | Nozawa |
| 9,606,222 B2 | 3/2017 | Bayha et al. |
| 9,618,742 B1 | 4/2017 | Droz et al. |
| 9,621,876 B2 | 4/2017 | Federspiel |
| 9,625,580 B2 | 4/2017 | Kotelnikov et al. |
| 9,638,799 B2 | 5/2017 | Goodwin |
| 9,671,094 B2 | 6/2017 | Ball |
| 9,696,426 B2 | 7/2017 | Zuk |
| 9,702,966 B2 | 7/2017 | Batcheller |
| 9,753,351 B2 | 9/2017 | Eldada |
| 9,778,364 B2 | 10/2017 | Gruver et al. |
| 9,791,555 B2 | 10/2017 | Zhu |
| 9,798,003 B2 | 10/2017 | Hammes et al. |
| 9,804,264 B2 | 10/2017 | Villeneuve et al. |
| 9,810,786 B1 | 11/2017 | Welford et al. |
| 9,812,838 B2 | 11/2017 | Villeneuve et al. |
| 9,817,121 B2 | 11/2017 | Inoue et al. |
| 9,823,351 B2 | 11/2017 | Haslim et al. |
| 9,823,353 B2 | 11/2017 | Eichenholz et al. |
| 9,857,468 B1 | 1/2018 | Eichenholz et al. |
| 9,857,472 B2 | 1/2018 | Mheen et al. |
| 9,869,753 B2 | 1/2018 | Eldada |
| 9,869,754 B1 | 1/2018 | Campbell et al. |
| 9,880,263 B2 | 1/2018 | Droz |
| 9,880,278 B2 | 1/2018 | Uffelen et al. |
| 9,885,778 B2 | 2/2018 | Dussan |
| 9,897,689 B2 | 2/2018 | Dussan |
| 9,915,726 B2 | 3/2018 | Bailey |
| 9,923,329 B2 | 3/2018 | Savage-Leuchs et al. |
| 9,927,915 B2 | 3/2018 | Frame |
| 9,958,545 B2 | 5/2018 | Eichenholz et al. |
| 9,989,755 B2 | 6/2018 | Fujimura et al. |
| 9,995,820 B2 | 6/2018 | Jachmann et al. |

(56) References Cited

U.S. PATENT DOCUMENTS

| | | |
|---|---|---|
| 10,007,001 B1 | 6/2018 | LaChapelle et al. |
| 10,012,732 B2 | 7/2018 | Eichenholz et al. |
| 10,018,724 B2 | 7/2018 | Royo Royo et al. |
| 10,031,214 B2 | 7/2018 | Rosenzweig et al. |
| 10,035,112 B2 | 7/2018 | Barcikowski et al. |
| 10,042,159 B2 | 8/2018 | Dussan et al. |
| 10,048,381 B2 | 8/2018 | Koehler |
| 10,061,019 B1 | 8/2018 | Campbell et al. |
| 10,073,166 B2 | 9/2018 | Dussan |
| 10,078,133 B2 | 9/2018 | Dussan |
| 10,094,925 B1 | 10/2018 | LaChapelle |
| 10,107,914 B2 | 10/2018 | Kalscheur et al. |
| 10,157,630 B2 | 12/2018 | Vaughn |
| 10,180,517 B2 | 1/2019 | Wiersema |
| 10,191,155 B2 | 1/2019 | Curatu |
| 10,203,399 B2 | 2/2019 | Retterath et al. |
| 10,215,847 B2 | 2/2019 | Scheim |
| 10,267,898 B2 | 4/2019 | Campbell et al. |
| 10,295,656 B1 | 5/2019 | Li et al. |
| 10,310,058 B1 | 6/2019 | Campbell et al. |
| 10,317,672 B2 | 6/2019 | Sarkar |
| 10,324,170 B1 | 6/2019 | Enberg, Jr. et al. |
| 10,324,171 B2 | 6/2019 | Niclass et al. |
| 10,324,185 B2 | 6/2019 | McWhirter et al. |
| 10,393,877 B2 | 8/2019 | Hall et al. |
| 10,401,482 B2 | 9/2019 | Kienzler et al. |
| 10,429,495 B1 | 10/2019 | Wang et al. |
| 10,444,356 B2 | 10/2019 | Wu et al. |
| 10,451,716 B2 | 10/2019 | Hughes et al. |
| 10,466,342 B1 | 11/2019 | Zhu et al. |
| 10,502,831 B2 | 12/2019 | Eichenholz |
| 10,509,112 B1 | 12/2019 | Pan |
| 10,520,602 B2 | 12/2019 | Villeneuve et al. |
| 10,557,923 B2 | 2/2020 | Watnik |
| 10,571,567 B2 | 2/2020 | Campbell et al. |
| 10,578,720 B2 | 3/2020 | Hughes et al. |
| 10,591,600 B2 | 3/2020 | Villeneuve |
| 10,627,491 B2 | 4/2020 | Hall et al. |
| 10,641,872 B2 | 5/2020 | Dussan et al. |
| 10,663,564 B2 | 5/2020 | LaChapelle |
| 10,663,585 B2 | 5/2020 | McWhirter |
| 10,663,595 B2 | 5/2020 | Curatu |
| 10,663,596 B2 | 5/2020 | Dussan et al. |
| 10,684,360 B2 | 6/2020 | Campbell |
| 10,698,110 B2 | 6/2020 | Verheggen et al. |
| 10,908,262 B2 | 2/2021 | Dussan |
| 10,908,265 B2 | 2/2021 | Dussan |
| 10,908,268 B2 | 2/2021 | Zhou et al. |
| 10,942,257 B2 | 3/2021 | Bao et al. |
| 10,969,475 B2 | 4/2021 | Li et al. |
| 10,983,218 B2 | 4/2021 | Hall et al. |
| 11,002,835 B2 | 5/2021 | Pan et al. |
| 11,009,605 B2 | 5/2021 | Li et al. |
| 11,194,022 B2 | 12/2021 | de Mersseman |
| 11,194,048 B1 | 12/2021 | Burbank et al. |
| 2001/0043717 A1 | 11/2001 | Laumeyer et al. |
| 2002/0136251 A1 | 9/2002 | Green |
| 2002/0149760 A1 | 10/2002 | Hipp |
| 2002/0149761 A1 | 10/2002 | Saccomanno |
| 2003/0046025 A1 | 3/2003 | Jamieson et al. |
| 2003/0066954 A1 | 4/2003 | Hipp |
| 2003/0080285 A1 | 5/2003 | Hipp |
| 2003/0184835 A1* | 10/2003 | Goldberg ............ G02B 26/123 359/204.1 |
| 2004/0062442 A1 | 4/2004 | Laumeyer et al. |
| 2004/0135992 A1 | 7/2004 | Munro |
| 2005/0033497 A1 | 2/2005 | Stopczynski |
| 2005/0034036 A1 | 2/2005 | Lages et al. |
| 2005/0088641 A1 | 4/2005 | Hung et al. |
| 2005/0190424 A1 | 9/2005 | Reichenbach et al. |
| 2005/0195383 A1 | 9/2005 | Breed et al. |
| 2005/0218128 A1 | 10/2005 | Han |
| 2006/0071846 A1 | 4/2006 | Yanagisawa et al. |
| 2006/0132752 A1 | 6/2006 | Kane |
| 2006/0145062 A1 | 7/2006 | Boehlau et al. |
| 2006/0146377 A1 | 7/2006 | Marshall et al. |
| 2006/0227317 A1 | 10/2006 | Henderson et al. |
| 2007/0024840 A1 | 2/2007 | Fetzer et al. |
| 2007/0091948 A1 | 4/2007 | Di |
| 2007/0181810 A1 | 8/2007 | Tan et al. |
| 2007/0216995 A1 | 9/2007 | Bollond et al. |
| 2007/0248136 A1 | 10/2007 | Leonardo et al. |
| 2008/0123170 A1 | 5/2008 | Reichert et al. |
| 2008/0174762 A1 | 7/2008 | Liu |
| 2008/0193135 A1 | 8/2008 | Du et al. |
| 2008/0210881 A1 | 9/2008 | Harris et al. |
| 2008/0247425 A1 | 10/2008 | Welford |
| 2008/0264164 A1 | 10/2008 | Solheim et al. |
| 2009/0002678 A1 | 1/2009 | Tanaka et al. |
| 2009/0010644 A1 | 1/2009 | Varshneya |
| 2009/0051926 A1 | 2/2009 | Chen |
| 2009/0059201 A1 | 3/2009 | Willner |
| 2009/0067453 A1 | 3/2009 | Mizuuchi et al. |
| 2009/0099813 A1 | 4/2009 | Dimsdale et al. |
| 2009/0102313 A1 | 4/2009 | West et al. |
| 2009/0147239 A1 | 6/2009 | Zhu |
| 2009/0245302 A1 | 10/2009 | Baird et al. |
| 2009/0252376 A1 | 10/2009 | Retterath et al. |
| 2009/0262760 A1 | 10/2009 | Krupkin |
| 2009/0316134 A1 | 12/2009 | Michael et al. |
| 2009/0324293 A1 | 12/2009 | Tomioka |
| 2010/0006760 A1 | 1/2010 | Lee |
| 2010/0007870 A1 | 1/2010 | Haberer et al. |
| 2010/0020306 A1 | 1/2010 | Hall |
| 2010/0020377 A1 | 1/2010 | Brochers et al. |
| 2010/0025798 A1 | 2/2010 | Itzler et al. |
| 2010/0027602 A1 | 2/2010 | Abshire |
| 2010/0045965 A1 | 2/2010 | Meneely |
| 2010/0053715 A1 | 3/2010 | O'Neill et al. |
| 2010/0097678 A1 | 4/2010 | Hajjar et al. |
| 2010/0114416 A1 | 5/2010 | Au et al. |
| 2010/0128109 A1 | 5/2010 | Banks |
| 2010/0128248 A1 | 5/2010 | Heizmann et al. |
| 2010/0165082 A1 | 7/2010 | Kiehn et al. |
| 2010/0245849 A1 | 9/2010 | Satzky et al. |
| 2010/0271614 A1 | 10/2010 | Albuquerque |
| 2010/0302528 A1 | 12/2010 | Hall |
| 2011/0032508 A1 | 2/2011 | Ludwig et al. |
| 2011/0085155 A1 | 4/2011 | Stann et al. |
| 2011/0102764 A1 | 5/2011 | Walsh et al. |
| 2011/0122895 A1 | 5/2011 | Savage-Leuchs et al. |
| 2011/0161031 A1 | 6/2011 | Dimsdale et al. |
| 2011/0176146 A1 | 7/2011 | Alvarez Diez et al. |
| 2011/0181864 A1 | 7/2011 | Schmitt et al. |
| 2011/0216304 A1 | 9/2011 | Hall |
| 2011/0235019 A1 | 9/2011 | Matsubara et al. |
| 2012/0035788 A1 | 2/2012 | Trepagnier et al. |
| 2012/0038903 A1 | 2/2012 | Weimer |
| 2012/0101680 A1 | 4/2012 | Trepagnier et al. |
| 2012/0124113 A1 | 5/2012 | Zalik |
| 2012/0162373 A1 | 6/2012 | Mheen et al. |
| 2012/0219020 A1 | 8/2012 | Fermann et al. |
| 2012/0221142 A1 | 8/2012 | Doak |
| 2012/0249996 A1 | 10/2012 | Tanaka et al. |
| 2013/0050676 A1 | 2/2013 | d'Aligny |
| 2013/0087689 A1 | 4/2013 | Woodward et al. |
| 2013/0107016 A1 | 5/2013 | Federspiel |
| 2013/0116971 A1 | 5/2013 | Retkowski et al. |
| 2013/0235366 A1 | 8/2013 | Giacotto et al. |
| 2013/0241761 A1 | 9/2013 | Cooper et al. |
| 2013/0293867 A1 | 11/2013 | Hsu |
| 2013/0293946 A1 | 11/2013 | Fermann |
| 2013/0329279 A1 | 12/2013 | Nati et al. |
| 2013/0342822 A1 | 12/2013 | Shiraishi |
| 2014/0027607 A1 | 1/2014 | Mordarski et al. |
| 2014/0063255 A1 | 3/2014 | Breed |
| 2014/0063489 A1 | 3/2014 | Steffey et al. |
| 2014/0078514 A1 | 3/2014 | Zhu |
| 2014/0104594 A1 | 4/2014 | Gammenthaler |
| 2014/0171523 A1* | 6/2014 | Lau ..................... A61K 33/243 516/97 |
| 2014/0233942 A1 | 8/2014 | Kanter |
| 2014/0300952 A1 | 10/2014 | Gusev et al. |
| 2014/0319638 A1 | 10/2014 | Chia |

(56) References Cited

U.S. PATENT DOCUMENTS

| | | |
|---|---|---|
| 2014/0320845 A1 | 10/2014 | Bayha et al. |
| 2014/0327945 A1 | 11/2014 | Weiss et al. |
| 2014/0332676 A1 | 11/2014 | Bayha et al. |
| 2014/0347650 A1 | 11/2014 | Bosch |
| 2014/0350836 A1 | 11/2014 | Stettner et al. |
| 2015/0015868 A1 | 1/2015 | Jachman et al. |
| 2015/0055117 A1 | 2/2015 | Pennecot et al. |
| 2015/0078123 A1 | 3/2015 | Batcheller |
| 2015/0084805 A1 | 3/2015 | Dawber |
| 2015/0109603 A1 | 4/2015 | Kim et al. |
| 2015/0116692 A1 | 4/2015 | Zuk |
| 2015/0124238 A1 | 5/2015 | Sakai et al. |
| 2015/0131080 A1 | 5/2015 | Retterath et al. |
| 2015/0139259 A1 | 5/2015 | Robinson |
| 2015/0153271 A1 | 6/2015 | Retterath et al. |
| 2015/0158489 A1 | 6/2015 | Oh et al. |
| 2015/0266472 A1 | 9/2015 | Ferguson et al. |
| 2015/0293228 A1 | 10/2015 | Retterath et al. |
| 2015/0332102 A1 | 11/2015 | Lu et al. |
| 2015/0338270 A1 | 11/2015 | Williams et al. |
| 2015/0355327 A1 | 12/2015 | Goodwin |
| 2015/0378012 A1 | 12/2015 | Sayyah et al. |
| 2016/0003946 A1 | 1/2016 | Gilliland |
| 2016/0047895 A1 | 2/2016 | Dussan |
| 2016/0047896 A1 | 2/2016 | Dussan |
| 2016/0047900 A1 | 2/2016 | Dussan |
| 2016/0061655 A1 | 3/2016 | Nozawa |
| 2016/0061935 A1 | 3/2016 | Mccloskey et al. |
| 2016/0100521 A1 | 4/2016 | Halloran |
| 2016/0117048 A1 | 4/2016 | Frame |
| 2016/0172819 A1 | 6/2016 | Ogaki |
| 2016/0178736 A1 | 6/2016 | Chung |
| 2016/0191870 A1* | 6/2016 | Hajjar .................. G09G 3/002 353/31 |
| 2016/0226210 A1 | 8/2016 | Zayhowski et al. |
| 2016/0245902 A1 | 8/2016 | Watnik |
| 2016/0259058 A1 | 9/2016 | Verheggen et al. |
| 2016/0291134 A1 | 10/2016 | Droz |
| 2016/0313445 A1 | 10/2016 | Bailey |
| 2016/0327646 A1 | 11/2016 | Scheim |
| 2017/0003116 A1 | 1/2017 | Yee et al. |
| 2017/0070029 A1 | 3/2017 | Moeneclaey et al. |
| 2017/0153319 A1 | 6/2017 | Villeneuve et al. |
| 2017/0155225 A1* | 6/2017 | Villeneuve .......... H01S 3/06758 |
| 2017/0168145 A1 | 6/2017 | Sakabe |
| 2017/0176579 A1 | 6/2017 | Niclass et al. |
| 2017/0242104 A1 | 8/2017 | Dussan |
| 2017/0276934 A1* | 9/2017 | Sarkar .................. G01B 11/002 |
| 2017/0299721 A1 | 10/2017 | Eichenholz |
| 2017/0307738 A1 | 10/2017 | Schwarz et al. |
| 2017/0365105 A1 | 12/2017 | Rao et al. |
| 2018/0020115 A1* | 1/2018 | Hipp .................. H04N 1/1931 |
| 2018/0040171 A1 | 2/2018 | Kundu et al. |
| 2018/0050704 A1 | 2/2018 | Tascione et al. |
| 2018/0059221 A1 | 3/2018 | Slobodyanyuk et al. |
| 2018/0069367 A1 | 3/2018 | Villeneuve et al. |
| 2018/0136331 A1 | 5/2018 | Rosenzweig et al. |
| 2018/0152691 A1 | 5/2018 | Pacala et al. |
| 2018/0158471 A1 | 6/2018 | Vaughn |
| 2018/0164439 A1 | 6/2018 | Droz et al. |
| 2018/0156896 A1 | 7/2018 | O'Keeffe |
| 2018/0188355 A1 | 7/2018 | Bao et al. |
| 2018/0188357 A1 | 7/2018 | Li |
| 2018/0188358 A1 | 7/2018 | Li |
| 2018/0188371 A1 | 7/2018 | Bao |
| 2018/0210084 A1 | 7/2018 | Zwölfer et al. |
| 2018/0217262 A1* | 8/2018 | Albelo .................. G01S 7/4817 |
| 2018/0275274 A1 | 9/2018 | Bao |
| 2018/0284237 A1* | 10/2018 | Campbell .............. G01S 17/931 |
| 2018/0284241 A1 | 10/2018 | Campbell et al. |
| 2018/0284242 A1 | 10/2018 | Campbell |
| 2018/0284285 A1* | 10/2018 | Curatu .................. G01S 17/10 |
| 2018/0284286 A1* | 10/2018 | Eichenholz ............ G01S 17/89 |
| 2018/0329060 A1 | 11/2018 | Pacala et al. |
| 2018/0359460 A1 | 12/2018 | Pacala et al. |
| 2019/0011567 A1 | 1/2019 | Pacala et al. |
| 2019/0025428 A1 | 1/2019 | Li |
| 2019/0094345 A1 | 3/2019 | Singer et al. |
| 2019/0101645 A1* | 4/2019 | DeMersseman ...... G01S 7/4812 |
| 2019/0107607 A1 | 4/2019 | Danziger |
| 2019/0107623 A1 | 4/2019 | Campbell et al. |
| 2019/0120942 A1 | 4/2019 | Zhang |
| 2019/0120962 A1 | 4/2019 | Gimpel et al. |
| 2019/0154804 A1 | 5/2019 | Eichenholz |
| 2019/0154807 A1 | 5/2019 | Steinkogler et al. |
| 2019/0212416 A1 | 7/2019 | Li et al. |
| 2019/0250254 A1 | 8/2019 | Campbell et al. |
| 2019/0250270 A1* | 8/2019 | Suzuki .................. G01S 7/4815 |
| 2019/0257924 A1 | 8/2019 | Li |
| 2019/0265334 A1 | 8/2019 | Zhang |
| 2019/0265336 A1 | 8/2019 | Zhang et al. |
| 2019/0265337 A1 | 8/2019 | Zhang |
| 2019/0265339 A1 | 8/2019 | Zhang |
| 2019/0277952 A1 | 9/2019 | Beuschel et al. |
| 2019/0310368 A1 | 10/2019 | LaChapelle |
| 2019/0369215 A1 | 12/2019 | Wang et al. |
| 2019/0369258 A1 | 12/2019 | Hall et al. |
| 2019/0383915 A1 | 12/2019 | Li et al. |
| 2020/0026071 A1 | 1/2020 | Bao et al. |
| 2020/0142070 A1 | 5/2020 | Hall et al. |
| 2020/0142073 A1 | 5/2020 | Gassend et al. |
| 2020/0142074 A1 | 5/2020 | Huber et al. |
| 2020/0142075 A1 | 5/2020 | Lee |
| 2020/0142076 A1 | 5/2020 | Gulo et al. |
| 2020/0256964 A1 | 8/2020 | Campbell et al. |
| 2020/0284906 A1* | 9/2020 | Eichenholz .......... G02B 27/0955 |
| 2020/0319310 A1 | 10/2020 | Hall et al. |
| 2020/0400798 A1 | 12/2020 | Rezk et al. |
| 2021/0088630 A9 | 3/2021 | Zhang |

FOREIGN PATENT DOCUMENTS

| | | |
|---|---|---|
| CN | 1322307 C | 6/2007 |
| CN | 101093285 A | 12/2007 |
| CN | 101231383 A | 7/2008 |
| CN | 101241182 A | 8/2008 |
| CN | 101246216 A | 8/2008 |
| CN | 201251669 Y | 6/2009 |
| CN | 101576620 A | 11/2009 |
| CN | 101641613 A | 2/2010 |
| CN | 101813778 A | 8/2010 |
| CN | 102083359 A | 6/2011 |
| CN | 102736075 A | 10/2012 |
| CN | 102971657 A | 3/2013 |
| CN | 103293530 A | 9/2013 |
| CN | 103403577 A | 11/2013 |
| CN | 103954971 A | 7/2014 |
| CN | 104914448 A | 9/2015 |
| CN | 204758260 U | 11/2015 |
| CN | 105143820 A | 12/2015 |
| CN | 204885804 U | 12/2015 |
| CN | 105319555 A | 2/2016 |
| CN | 107076838 A | 8/2017 |
| CN | 107450060 A | 12/2017 |
| CN | 108132472 A | 6/2018 |
| CN | 207457508 U | 6/2018 |
| CN | 207557465 U | 6/2018 |
| CN | 208314210 U | 1/2019 |
| CN | 208421228 U | 1/2019 |
| CN | 208705506 U | 4/2019 |
| CN | 106597471 B | 5/2019 |
| CN | 209280923 U | 8/2019 |
| CN | 108445468 B | 11/2019 |
| CN | 110031823 B | 3/2020 |
| CN | 108089201 B | 4/2020 |
| CN | 109116331 B | 4/2020 |
| CN | 109917408 B | 4/2020 |
| CN | 109116366 B | 5/2020 |
| CN | 109116367 B | 5/2020 |
| CN | 110031822 B | 5/2020 |
| CN | 211655309 U | 10/2020 |
| CN | 109188397 B | 11/2020 |
| CN | 109814086 B | 11/2020 |
| CN | 109917348 B | 11/2020 |

(56) References Cited

FOREIGN PATENT DOCUMENTS

| | | |
|---|---|---|
| CN | 110492856 B | 11/2020 |
| CN | 110736975 B | 11/2020 |
| CN | 109725320 B | 12/2020 |
| CN | 110780284 B | 12/2020 |
| CN | 110780283 B | 1/2021 |
| CN | 110784220 B | 2/2021 |
| CN | 212623082 U | 2/2021 |
| CN | 110492349 B | 3/2021 |
| CN | 109950784 B | 5/2021 |
| CN | 213182011 U | 5/2021 |
| CN | 213750313 U | 7/2021 |
| CN | 214151038 U | 9/2021 |
| CN | 109814082 B | 10/2021 |
| CN | 113491043 A | 10/2021 |
| CN | 214795200 U | 11/2021 |
| CN | 214795206 U | 11/2021 |
| CN | 214895784 U | 11/2021 |
| CN | 214895810 U | 11/2021 |
| CN | 215641806 U | 1/2022 |
| CN | 112639527 B | 2/2022 |
| CN | 215932142 U | 3/2022 |
| CN | 112578396 B | 4/2022 |
| DE | 197 57 848 A1 | 7/1999 |
| EP | 0 757 257 A2 | 2/1997 |
| EP | 1237305 A2 | 9/2002 |
| EP | 1923721 A1 | 5/2008 |
| EP | 2157445 A2 | 2/2010 |
| EP | 2395368 A1 | 12/2011 |
| EP | 2 889 642 A1 | 7/2015 |
| EP | 2889642 A1 | 7/2015 |
| GB | 1 427 164 A | 3/1976 |
| GB | 2000411 A | 1/1979 |
| GB | 2487518 A | 7/2012 |
| JP | S50-85346 A | 7/1975 |
| JP | 4-223422 A | 8/1992 |
| JP | 2007144667 A | 6/2007 |
| JP | 2007301756 A | 11/2007 |
| JP | 2008-70159 A | 3/2008 |
| JP | 2008-298520 A | 12/2008 |
| JP | 2009-121836 A | 6/2009 |
| JP | 2010035385 A | 2/2010 |
| JP | 2010038859 A | 2/2010 |
| JP | 2010-60309 A | 3/2010 |
| JP | 2011-257193 A | 12/2011 |
| JP | 2012-211831 A | 11/2012 |
| JP | 2013-238440 A | 11/2013 |
| JP | 2014-71038 A | 4/2014 |
| JP | 2016-40662 A | 3/2016 |
| JP | 2017-003347 A | 1/2017 |
| JP | 2017-138301 A | 8/2017 |
| KR | 10-2012-0013515 A | 2/2012 |
| KR | 10-2013-0068224 A | 6/2013 |
| KR | 10-2018-0107673 A | 10/2018 |
| KR | 1020190084574 A | 7/2019 |
| WO | 92/22109 A1 | 12/1992 |
| WO | 2007095329 A2 | 8/2007 |
| WO | 2012051700 A1 | 4/2012 |
| WO | 2016002776 A1 | 1/2016 |
| WO | 2016/056545 A1 | 4/2016 |
| WO | 2016175395 A2 | 11/2016 |
| WO | 2017/110417 A1 | 6/2017 |
| WO | 2018/125725 A1 | 7/2018 |
| WO | 2018/129410 A1 | 7/2018 |
| WO | 2018129408 A1 | 7/2018 |
| WO | 2018129409 A1 | 7/2018 |
| WO | 2018129410 A1 | 7/2018 |
| WO | 2018175990 A1 | 9/2018 |
| WO | 2018182812 A2 | 10/2018 |
| WO | 2019079642 A1 | 4/2019 |
| WO | WO2019165095 A1 | 8/2019 |
| WO | WO2019165289 A1 | 8/2019 |
| WO | WO2019165294 A1 | 8/2019 |
| WO | 2020013890 A2 | 1/2020 |

OTHER PUBLICATIONS

Goldstein, R. (Apr. 1986) "Electro-Optic Devices in Review, The Linear Electro-Optic (Pockels) Effect Forms the Basis for a Family of Active Devices," Laser & Applications, FastPulse Technology, Inc., six pages.

International Preliminary Report on Patentability and Written Opinion of the International Searching Authority, dated Sep. 18, 2018, for PCT Application No. PCT/US2018/12116, filed Jan. 2, 2018, 11 pages.

International Preliminary Report on Patentability, and Written Opinion dated Jul. 9, 2019, for PCT Application No. PCT/US2018/012703, filed Jan. 5, 2018, 10 pages.

International Preliminary Report on Patentability, dated Jul. 9, 2019, for PCT Application No. PCT/US2018/012704, filed Jan. 5, 2018, 7 pages.

International Preliminary Report on Patentability, dated Jul. 9, 2019, for PCT Application No. PCT/US2018/012705, filed Jan. 5, 2018, 7 pages.

International Search Report and Written Opinion, dated Jul. 9, 2019, for PCT Application No. PCT/US2019/18987, 17 pages.

International Search Report and Written Opinion, dated May 3, 2019, for PCT Application No. PCT/US2019/19272, 16 pages.

International Search Report and Written Opinion, dated May 6, 2019, for PCT Application No. PCT/US2019/19264, 15 pages.

International Search Report and Written Opinion, dated Jan. 3, 2019, for PCT Application No. PCT/US2018/056577, nine pages.

International Search Report, dated Jun. 7, 2018, for PCT Application No. PCT/US2018/24185, filed Mar. 23, 2018, 2 pages.

International Search Report, dated Mar. 19, 2018, for PCT Application No. PCT/US2018/012705, filed Jan. 6, 2018, 2 pages.

International Search Report, dated Mar. 20, 2018, for PCT Application No. PCT/US2018/012703, filed Jan. 5, 2018, 2 pages.

International Search Report, dated Mar. 23, 2018, for PCT Application No. PCT/US2018/012704, filed Jan. 5, 2018, 2 pages.

International Search Report, dated Sep. 18, 2018, for PCT Application No. PCT/US2018/12116, filed Jan. 2, 2018, 2 pages.

Written Opinion of the International Searching Authority, dated Jun. 7, 2018, for PCT Application No. PCT/US2018/24185, filed Mar. 23, 2018, 5 pages.

Written Opinion of the International Searching Authority, dated Mar. 19, 2018, for PCT Application No. PCT/US2018/012705, filed Jan. 5, 2018, 6 pages.

Written Opinion of the International Searching Authority, dated Mar. 20, 2018, for PCT Application No. PCT/US2018/012703, filed Jan. 5, 2018, 9 pages.

Written Opinion of the International Searching Authority, dated Mar. 23, 2018, for PCT Application No. PCT/US2018/012704, filed Jan. 5, 2018, 6 pages.

Non-Final Office Action dated Feb. 18, 2021, for U.S. Appl. No. 15/860,598, filed Jan. 2, 2018, thirteen pages.

Notice of Allowance dated Mar. 26, 2021, for U.S. Appl. No. 15/857,566, filed Dec. 28, 2017, ten pages.

Non-Final Office Action dated Dec. 16, 2020, for U.S. Appl. No. 15/857,566, filed Dec. 28, 2017, eight pages.

Notice of Allowance dated Dec. 2, 2020, for U.S. Appl. No. 15/863,695, filed Jan. 5, 2018, five pages.

Notice of Allowance, (corrected) dated Jan. 8, 2021, for U.S. Appl. No. 15/863,695, filed Jan. 5, 2018, two pages.

European Search Report, dated Jul. 17, 2020, for EP Application No. 18776977.3, twelve pages.

Extended European Search Report, dated Jul. 10, 2020, for EP Application No. 18736738.8, nine pages.

Extended European Search Report, dated Jul. 22, 2020, for EP Application No. 18736685.1, ten pages.

Final Office Action dated Oct. 8, 2020, for U.S. Appl. No. 15/857,563, filed Dec. 28, 2017, thirteen pages.

Gunzung, Kim, et al. (Mar. 2, 2016). "A hybrid 3D LIDAR imager based on pixel-by-pixel scanning and DS-OCDMA," Proceedings of SPIE; [Proceedings of SPIE ISSN 0277-786X vol. 10524], SPIE, US, vol. 9751, pp. 975119-1-975119-8.

(56) References Cited

OTHER PUBLICATIONS

International Preliminary Report on Patentability dated Apr. 30, 2020, for PCT Application No. PCT/US2018/056577, eight pages.
J. Gluckman. (May 13, 2016). "Design of the processing chain for a high-altitude, airborne, single-photon lidar mapping instrument," Proceedings of SPIE; [Proceedings of SPIE ISSN 0277-786X vol. 10524], SPIE, US, vol. 9832, pp. 983203-983203.
Non-Final Office Action dated Apr. 1, 2020, for U.S. Appl. No. 15/857,566, filed Dec. 28, 2017, twenty one pages.
Non-Final Office Action dated Apr. 30, 2020, for U.S. Appl. No. 15/860,598, filed Jan. 2, 2018, thirteen pages.
Non-Final Office Action dated Jun. 2, 2020, for U.S. Appl. No. 15/934,807, filed Mar. 23, 2018, thirteen pages.
Non-Final Office Action dated Mar. 26, 2020, for U.S. Appl. No. 15/857,563, filed Dec. 28, 2017, twenty three pages.
Non-Final Office Action dated Mar. 30, 2020, for U.S. Appl. No. 15/863,695, filed Jan. 5, 2018, eight pages.
"Mirrors", Physics LibreTexts, https://phys.libretexts.org/Bookshelves/Optics/Supplemental_Modules_(Components)/Mirrors, (2021), 2 pages.
"Why Wavelengths Matter in Fiber Optics", FirstLight, https://www.firstlight.net/why-wavelengths-matter-in-fiber-optics/, (2021), 5 pages.
International Search Report and Written Opinion issued in International Application No. PCT/US19/19276 dated Jan. 17, 2020, 9 pages.
International Search Report & Written Opinion received for PCT Patent Application No. PCT/US2017/067701, dated Mar. 9, 2018, 14 pages.
Office Action issued in Japanese Patent Application No. 2018-554580 dated Oct. 25, 2019, 13 pages.
International Search Report and Written Opinion issued in International Application No. PCT/US2018/065455 dated Jul. 17, 2019, 21 pages.
Office Action issued in Korean Patent Application No. 10-2018-7030223 dated Jun. 20, 2019, 20 pages.
Office Action issued in Korean Patent Application No. 10-2020-7022102 dated Mar. 16, 2021, 8 pages.
Office Action issued in Japanese Patent Application No. 2020-153958 dated Mar. 16, 2021, 7 pages.
Office Action issued in Chinese Patent Application No. 2017800032023 dated Jun. 9, 2021, 18 pages.
Da-Peng et al., "Overview of beam steering technology based on rotational double prisms," Chinese Optics, vol. 6, No. 2, 2013, pp. 136-150.
Noguchi et al., "Capturing Device for Dense Point Cloud of Indoor People using Horizontal LIDAR and Pan Rotation of Vertical LIDAR with Mirrors," 2012 IEEE/SICE International Symposium on System Integration (SII), pp. 428-433.
Office Action issued in German Application No. 11 2017 000 127.7 dated Dec. 21, 2021, 19 pages.
Office Action Issued in Japanese Patent Application No. 2019-536019 dated Nov. 30, 2021, 6 pages.
European Search Report, dated Jun. 17, 2021, for EP Application No. 18868896.4, 7 pages.
Fiber laser, Wikipedia, https://en.wikipedia.org/wiki/Fiber_laser, 6 pages.
Rodriguez, et al., "Multi-beam and single-chip LIDAR with discrete beam steering by digital micromirror device," 4 Proc. SPIE 10526, Physics and Simulation of Optoelectronic Devices XXVI, 105260U (Feb. 23, 2018); doi: 10.1117/12.2287485, SPIE OPTO, 2018, San Francisco, California, United States, 7 pages.
Office Action issued Japanese Patent Application No. 2021-110848 dated Oct. 6, 2022, 10 pages.
Office Action issued Japanese Patent Application No. 2021-110848 dated Jun. 3, 2022, 16 pages.
Office Action issued in Chinese Patent Application No. 202210285659.0 dated Aug. 31, 2022, 12 pages.
Office Action issued in Chinese Patent Application No. 201980027459.1 dated Dec. 9, 2023, 10 pages.

* cited by examiner

2-DIMENSIONAL STEERING SYSTEM FOR LIDAR SYSTEMS

CROSS-REFERENCE TO RELATED APPLICATIONS

This application claims priority to U.S. Provisional Patent Application Ser. No. 62/634,661, filed Feb. 23, 2018, entitled "2-Dimensional Steering System for LiDAR Systems," the content of which is hereby incorporated by reference for all purposes.

FIELD

This disclosure relates generally to laser scanning and, more particularly, to using a rotating polygon with one or more light sources and detectors.

BACKGROUND

Light detection and ranging (LiDAR) systems use light pulses to create an image or point cloud of the external environment. Some typical LiDAR systems include a light source, a pulse steering system, and light detector. The light source generates light pulses that are directed by the pulse steering system in particular directions when being transmitted from the LiDAR system. When a transmitted light pulse is scattered by an object, some of the scattered light is returned to the LiDAR system as a returned pulse. The light detector detects the returned pulse. Using the time it took for the returned pulse to be detected after the light pulse was transmitted and the speed of light, the LiDAR system can determine the distance to the object along the path of the transmitted light pulse. The pulse steering system can direct light pulses along different paths to allow the LiDAR system to scan the surrounding environment and produce an image or point cloud. LiDAR systems can also use techniques other than time-of-flight and scanning to measure the surrounding environment.

SUMMARY

In one example embodiment of LiDAR system, a rotatable polygon has a plurality of reflective sides including a first reflective side. The rotatable polygon scans one or more first light signals in a first direction. A scanning optic scans the one or more first light signals in a second direction different than the first direction. A first light source directs the one or more first light signals to one or more of the plurality of reflective sides of the rotatable polygon or the scanning optic. First detector detects a first return light signal associated with a signal of the one or more first light signals. One or more optics focus the first return light signal on the first detector.

BRIEF DESCRIPTION OF THE DRAWINGS

The present application can be best understood by reference to the figures described below taken in conjunction with the accompanying drawing figures, in which like parts may be referred to by like numerals.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Some light detection and ranging (LiDAR) systems use a single light source to produce one or more light signals of a single wavelength that scan the surrounding environment. The signals are scanned using steering systems that direct the pulses in one or two dimensions to cover an area of the surrounding environment (the scan area). When these systems use mechanical means to direct the pulses, the system complexity increases because more moving parts are required. Additionally, only a single signal can be emitted at any one time because two or more identical signals would introduce ambiguity in returned signals. In some embodiments of the present technology, these disadvantages and/or others are overcome.

For example, some embodiments of the present technology use one or more light sources that produce light signals of different wavelengths and/or along different optical paths. These light sources provide the signals to a signal steering system at different angles so that the scan areas for the light signals are different (e.g., if two light sources are used to create two light signals, the scan area associated with each light source is different). This allows for tuning the signals to appropriate transmit powers and the possibility of having overlapping scan areas that cover scans of different distances. Longer ranges can be scanned with signals having higher power and/or slower repetition rate (e.g., when using pulsed light signals). Shorter ranges can be scanned with signals having lower power and/or high repetition rate (e.g., when using pulse light signals) to increase point density.

As another example, some embodiments of the present technology use signal steering systems with one or more dispersion elements (e.g., gratings, optical combs, prisms, etc.) to direct pulse signals based on the wavelength of the pulse. A dispersion element can make fine adjustments to a pulse's optical path, which may be difficult or impossible with mechanical systems. Additionally, using one or more dispersion elements allows the signal steering system to use few mechanical components to achieve the desired scanning capabilities. This results in a simpler, more efficient (e.g., lower power) design that is potentially more reliable (due to few moving components).

Figure 1:
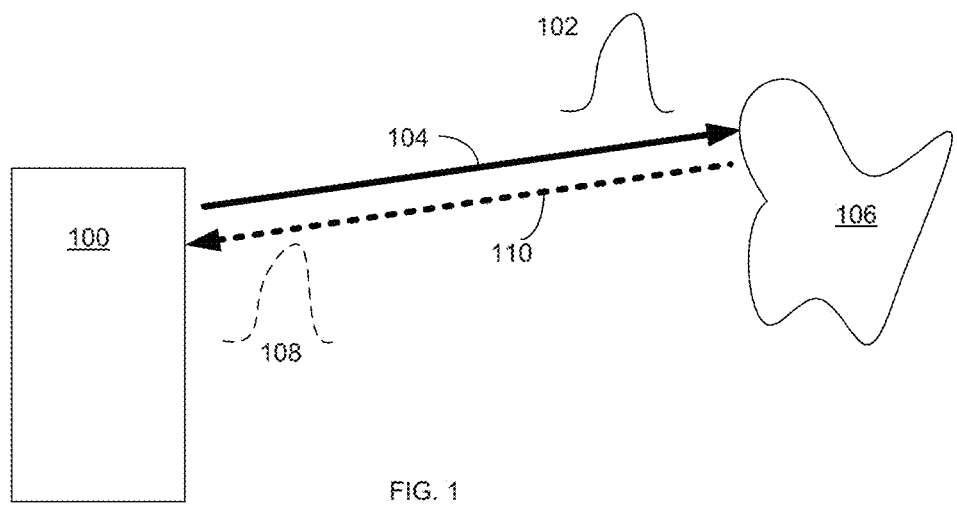
FIGS. 1-3 illustrate an exemplary LiDAR system using pulse signal to measure distances to points in the outside environment.

Some LiDAR systems use the time-of-flight of light signals (e.g., light pulses) to determine the distance to objects in the path of the light. For example, with respect to FIG. 1, an exemplary LiDAR system 100 includes a laser light source (e.g., a fiber laser), a steering system (e.g., a system of one or more moving mirrors), and a light detector (e.g., a photon detector with one or more optics). LiDAR system 100 transmits light pulse 102 along path 104 as determined by the steering system of LiDAR system 100. In the depicted example, light pulse 102, which is generated by the laser light source, is a short pulse of laser light. Further, the signal steering system of the LiDAR system 100 is a pulse signal steering system. However, it should be appreciated that LiDAR systems can operate by generating, transmitting, and detecting light signals that are not pulsed and/use derive ranges to object in the surrounding environment using techniques other than time-of-flight. For example, some LiDAR systems use frequency modulated continuous waves (i.e., "FMCW"). It should be further appreciated that any of the techniques described herein with respect to time-of-flight based systems that use pulses also may be applicable to LiDAR systems that do not use one or both of these techniques.

Referring back to FIG. 1 (a time-of-flight LiDAR system that uses light pulses) when light pulse 102 reaches object 106, light pulse 102 scatters and returned light pulse 108 will be reflected back to system 100 along path 110. The time from when transmitted light pulse 102 leaves LiDAR system 100 to when returned light pulse 108 arrives back at LiDAR system 100 can be measured (e.g., by a processor or other electronics within the LiDAR system). This time-of-flight combined with the knowledge of the speed of light can be used to determine the range/distance from LiDAR system 100 to the point on object 106 where light pulse 102 scattered.

Figure 2:
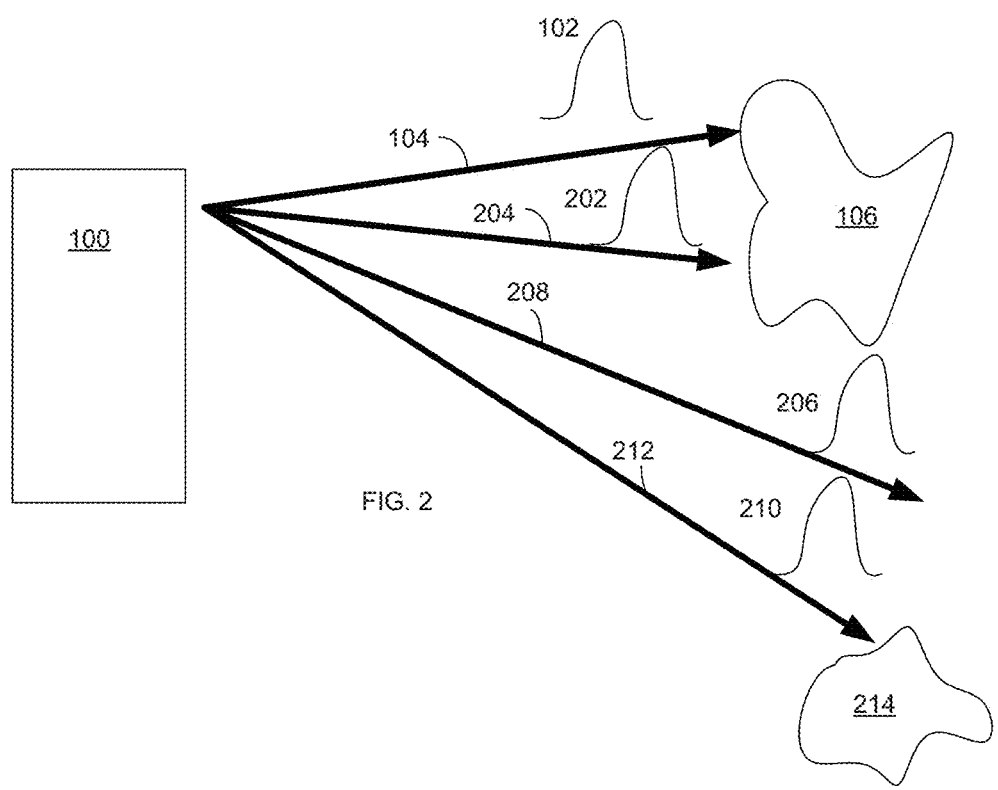
Figure 3:
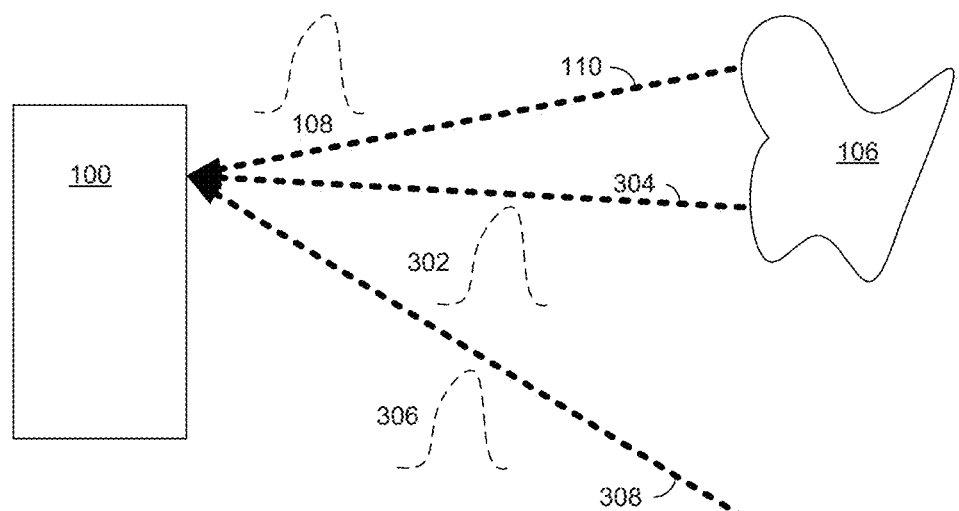

By directing many light pulses, as depicted in FIG. 2, LiDAR system 100 scans the external environment (e.g., by directing light pulses 102, 202, 206, 210 along paths 104, 204, 208, 212, respectively). As depicted in FIG. 3, LiDAR system 100 receives returned light pulses 108, 302, 306 (which correspond to transmitted light pulses 102, 202, 210, respectively) back after objects 106 and 214 scatter the transmitted light pulses and reflect pulses back along paths 110, 304, 308, respectively. Based on the direction of the transmitted light pulses (as determined by LiDAR system 100) as well as the calculated range from LiDAR system 100 to the points on objects that scatter the light pulses (e.g., the points on objects 106 and 214), the surroundings within the detection range (e.g., the field of view between path 104 and 212, inclusively) can be precisely plotted (e.g., a point cloud or image can be created).

If a corresponding light pulse is not received for a particular transmitted light pulse, then it can be determined that there are no objects within a certain range of LiDAR system 100 (e.g., the max scanning distance of LiDAR system 100). For example, in FIG. 2, light pulse 206 will not have a corresponding returned light pulse (as depicted in FIG. 3) because it did not produce a scattering event along its transmission path 208 within the predetermined detection range. LiDAR system 100 (or an external system communication with LiDAR system 100) can interpret this as no object being along path 208 within the detection range of LiDAR system 100.

In FIG. 2, transmitted light pulses 102, 202, 206, 210 can be transmitted in any order, serially, in parallel, or based on other timings with respect to each other. Additionally, while FIG. 2 depicts a 1-dimensional array of transmitted light pulses, LiDAR system 100 optionally also directs similar arrays of transmitted light pulses along other planes so that a 2-dimensional array of light pulses is transmitted. This 2-dimensional array can be transmitted point-by-point, line-by-line, all at once, or in some other manner. The point cloud or image from a 1-dimensional array (e.g., a single horizontal line) will produce 2-dimensional information (e.g., (1) the horizontal transmission direction and (2) the range to objects). The point cloud or image from a 2-dimensional array will have 3-dimensional information (e.g., (1) the horizontal transmission direction, (2) the vertical transmission direction, and (3) the range to objects).

The density of points in point cloud or image from a LiDAR system 100 is equal to the number of pulses divided by the field of view. Given that the field of view is fixed, to increase the density of points generated by one set of transmission-receiving optics, the LiDAR system should fire a pulse more frequently; in other words, a light source with a higher repetition rate is needed. However, by sending pulses more frequently the farthest distance that the LiDAR system can detect may be more limited. For example, if a returned signal from a distant object is received after the system transmits the next pulse, the return signals may be detected in a different order than the order in which the corresponding signals are transmitted, thereby causing ambiguity if the system cannot correctly correlate the returned signals with the transmitted signals. To illustrate, consider an exemplary LiDAR system that can transmit laser pulses with a repetition rate between 500 kHz and 1 MHz. Based on the time it takes for a pulse to return to the LiDAR system and to avoid mix-up of returned pulses from consecutive pulses in conventional LiDAR design, the farthest distance the LiDAR system can detect may be 300 meters and 150 meters for 500 kHz and 1 Mhz, respectively. The density of points of a LiDAR system with 500 kHz repetition rate is half of that with 1 MHz. Thus, this example demonstrates that, if the system cannot correctly correlate returned signals that arrive out of order, increasing the repetition rate from 500 kHz to 1 Mhz (and thus improving the density of points of the system) would significantly reduce the detection range of the system.

Figure 4:
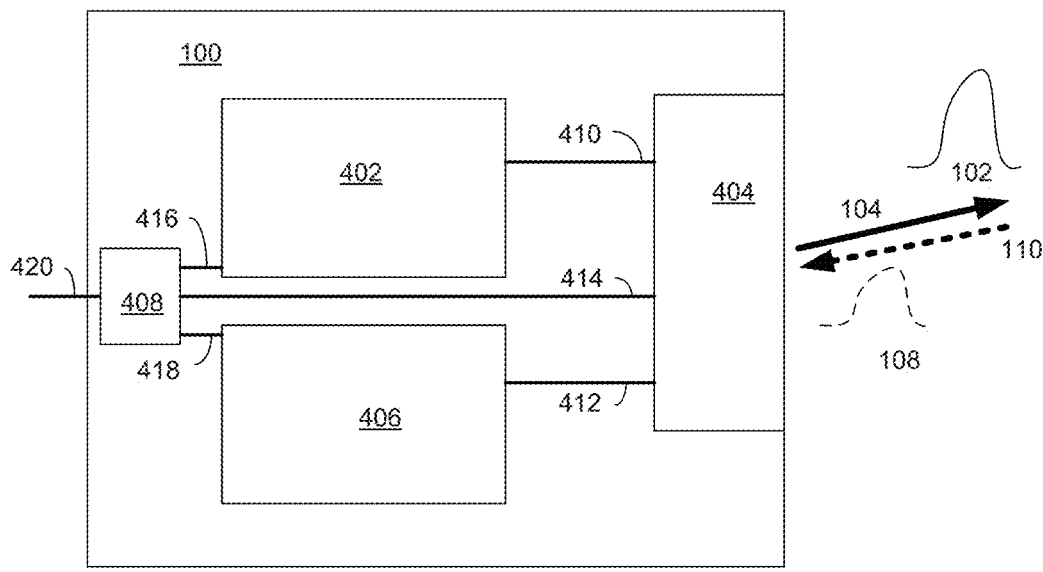
FIG. 4 depicts a logical block diagram of the exemplary LiDAR system.

FIG. 4 depicts a logical block diagram of LiDAR system 100, which includes light source 402, signal steering system 404, pulse detector 406, and controller 408. These components are coupled together using communications paths 410, 412, 414, 416, and 418. These communications paths represent communication (bidirectional or unidirectional) among the various LiDAR system components but need not be physical components themselves. While the communications paths can be implemented by one or more electrical wires, busses, or optical fibers, the communication paths can also be wireless channels or open-air optical paths so that no physical communication medium is present. For example, in one exemplary LiDAR system, communication path 410 is one or more optical fibers, communication path 412 represents an optical path, and communication paths 414, 416, 418, and 420 are all one or more electrical wires that carry electrical signals. The communications paths can also include more than one of the above types of communication mediums (e.g., they can include an optical fiber and an optical path or one or more optical fibers and one or more electrical wires).

LiDAR system 100 can also include other components not depicted in FIG. 4, such as power buses, power supplies, LED indicators, switches, etc. Additionally, other connections among components may be present, such as a direct connection between light source 402 and light detector 406 so that light detector 406 can accurately measure the time from when light source 402 transmits a light pulse until light detector 406 detects a returned light pulse.

Figure 5:
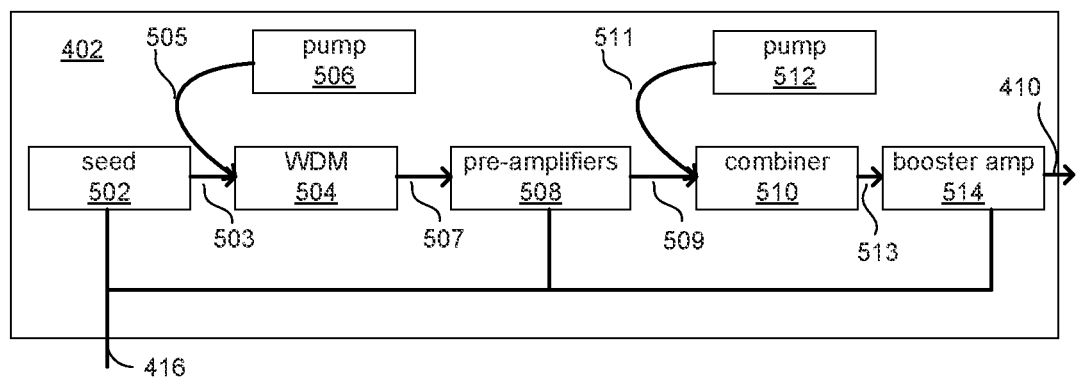
FIG. 5 depicts a light source of the exemplary LiDAR system.

FIG. 5 depicts a logical block diagram of one example of light source 402 that is based on a laser fiber, although any number of light sources with varying architecture could be used as part of the LiDAR system. Light source 402 uses seed 502 to generate initial light pulses of one or more wavelengths (e.g., 1550 nm), which are provided to wavelength-division multiplexor (WDM) 504 via fiber 503. Pump 506 also provides laser power (of a different wavelength, such as 980 nm) to WDM 504 via fiber 505. The output of WDM 504 is provided to pre-amplifiers 508 (which includes one or more amplifiers) which provides its output to combiner 510 via fiber 509. Combiner 510 also takes laser power from pump 512 via fiber 511 and provides pulses via fiber 513 to booster amplifier 514, which produces output light pulses on fiber 410. The outputted light pulses are then fed to steering system 404. In some variations, light source 402 can produce pulses of different amplitudes based on the fiber gain profile of the fiber used in the source. Communication path 416 couples light source 402 to controller 408 (FIG. 4) so that components of light source 402 can be controlled by or otherwise communicate with controller 408. Alternatively, light source 402 may include its own controller. Instead of controller 408 communicating directly with components of light source 402, a dedicated light source controller communicates with controller 408 and controls and/or communicates with the components of light source 402. Light source 402 also includes other components not shown, such as one or more power connectors, power supplies, and/or power lines.

Some other light sources include one or more laser diodes, short-cavity fiber lasers, solid-state lasers, and/or tunable external cavity diode lasers, configured to generate one or more light signals at various wavelengths. In some examples, light sources use amplifiers (e.g., pre-amps or booster amps) include a doped optical fiber amplifier, a solid-state bulk amplifier, and/or a semiconductor optical amplifier, configured to receive and amplify light signals.

Returning to FIG. 4, signal steering system 404 includes any number of components for steering light signals generated by light source 402. In some examples, signal steering system 404 may include one or more optical redirection elements (e.g., mirrors or lens) that steer light pulses (e.g., by rotating, vibrating, or directing) along a transmit path to scan the external environment. For example, these optical redirection elements may include MEMS mirrors, rotating polyhedron mirrors, or stationary mirrors to steer the transmitted pulse signals to different directions. Signal steering system 404 optionally also includes other optical components, such as dispersion optics (e.g., diffuser lenses, prisms, or gratings) to further expand the coverage of the transmitted signal in order to increase the LiDAR system 100's transmission area (i.e., field of view). An example signal steering system is described in U.S. patent application Ser. No. 15/721,127 filed on Sep. 29, 2017, entitled "2D Scanning High Precision LiDAR Using Combination of Rotating Concave Mirror and Beam Steering Devices," the content of which is incorporated by reference in its entirety herein for all purposes. In some examples, signal steering system 404 does not contain any active optical components (e.g., it does not contain any amplifiers). In some other examples, one or more of the components from light source 402, such as a booster amplifier, may be included in signal steering system 404. In some instances, signal steering system 404 can be considered a LiDAR head or LiDAR scanner.

Some implementations of signal steering systems include one or more optical redirection elements (e.g., mirrors or lens) that steers returned light signals (e.g., by rotating, vibrating, or directing) along a receive path to direct the returned light signals to the light detector. The optical redirection elements that direct light signals along the transmit and receive paths may be the same components (e.g., shared), separate components (e.g., dedicated), and/or a combination of shared and separate components. This means that in some cases the transmit and receive paths are different although they may partially overlap (or in some cases, substantially overlap).

Figure 6:
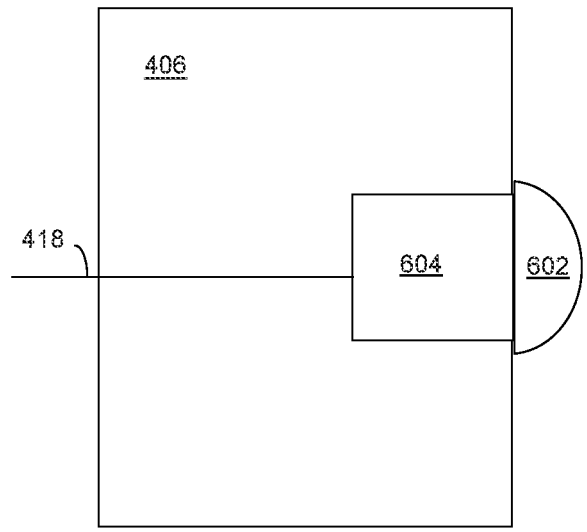
FIG. 6 depicts a light detector of the exemplary LiDAR system.

FIG. 6 depicts a logical block diagram of one possible arrangement of components in light detector 406 of LiDAR system 100 (FIG. 4). Light detector 406 includes optics 604 (e.g., a system of one or more optical lenses) and detector 602 (e.g., a charge coupled device (CCD), a photodiode, an avalanche photodiode, a photomultiplier vacuum tube, an image sensor, etc.) that is connected to controller 408 (FIG. 4) via communication path 418. The optics 604 may include one or more photo lenses to receive, focus, and direct the returned signals. Light detector 406 can include filters to selectively pass light of certain wavelengths. Light detector 406 can also include a timing circuit that measures the time from when a pulse is transmitted to when a corresponding returned pulse is detected. This data can then be transmitted to controller 408 (FIG. 4) or to other devices via communication line 418. Light detector 406 can also receive information about when light source 402 transmitted a light pulse via communication line 418 or other communications lines that are not shown (e.g., an optical fiber from light source 402 that samples transmitted light pulses). Alternatively, light detector 406 can provide signals via communication line 418 that indicate when returned light pulses are detected. Other pulse data, such as power, pulse shape, and/or wavelength, can also be communicated.

Returning to FIG. 4, controller 408 contains components for the control of LiDAR system 100 and communication with external devices that use the system. For example, controller 408 optionally includes one or more processors, memories, communication interfaces, sensors, storage devices, clocks, ASICs, FPGAs, and/or other devices that control light source 402, signal steering system 404, and/or light detector 406. In some examples, controller 408 controls the power, rate, timing, and/or other properties of light signals generated by light source 402; controls the speed, transmit direction, and/or other parameters of light steering system 404; and/or controls the sensitivity and/or other parameters of light detector 406.

Controller 408 optionally is also configured to process data received from these components. In some examples, controller determines the time it takes from transmitting a light pulse until a corresponding returned light pulse is received; determines when a returned light pulse is not received for a transmitted light pulse; determines the transmitted direction (e.g., horizontal and/or vertical information) for a transmitted/returned light pulse; determines the estimated range in a particular direction; and/or determines any other type of data relevant to LiDAR system 100.

Figure 7:
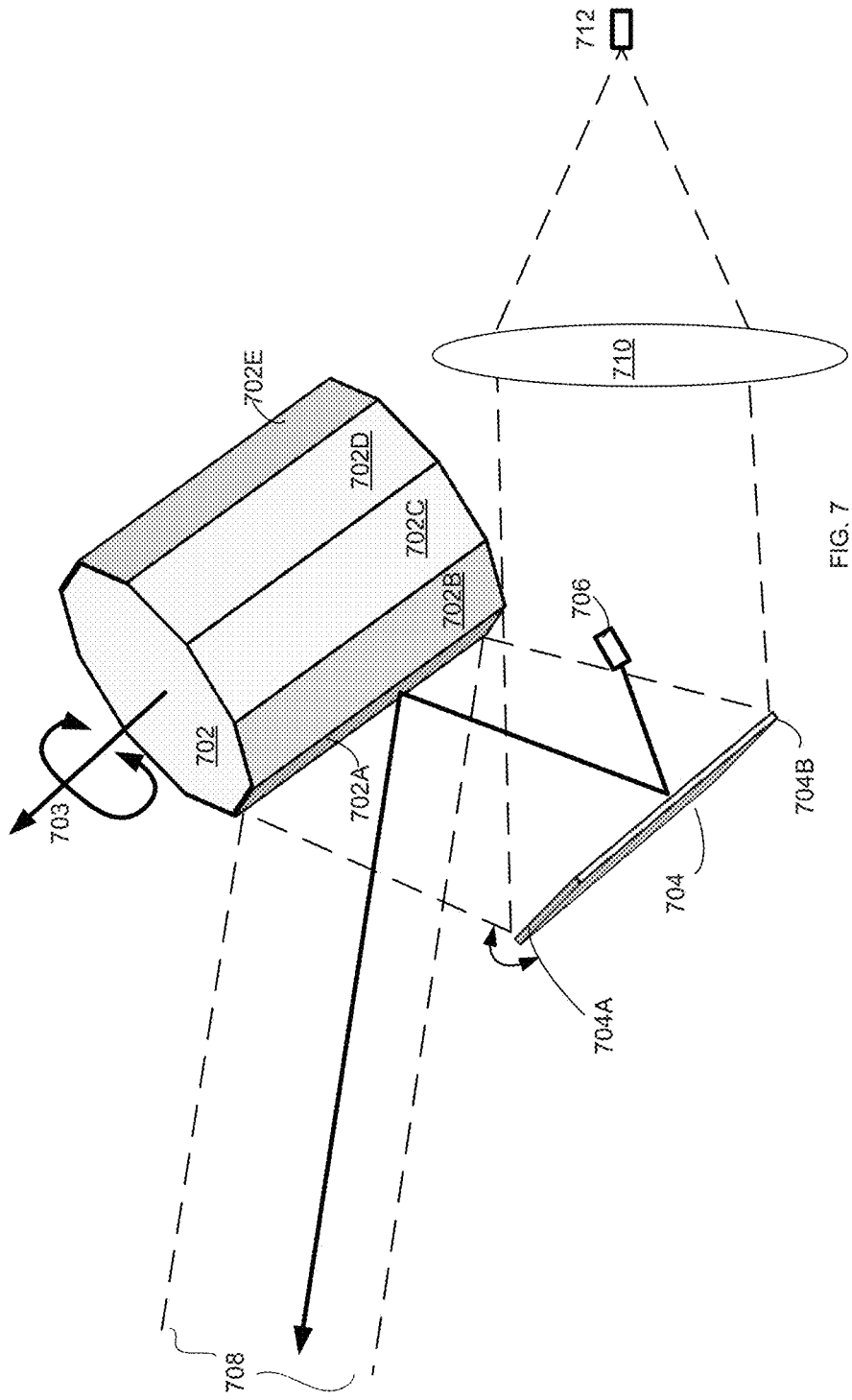
FIG. 7 depicts an embodiment of a signal steering system using a single light source and detector.

FIG. 7 depicts an embodiment of a signal steering system (e.g., signal steering system 404 of FIG. 4) according to some embodiments of the present technology. Polygon 702 has ten reflective sides (sides 702A-702E are visible in FIG. 7) but can have any number of reflective sides. For example, other examples of polygon 702 has 6, 8, or 20 sides). In some embodiments, the polygon is wedge-shaped. For example, one or more reflective sides of the polygon are of a trapezoid shape. Polygon 702 rotates about axis 703 based on a drive motor (not shown) to scan signals delivered from a light source (e.g., via output 706, which is connected to a light source such as light source 402 described above) along a direction perpendicular to axis of rotation 703. One implementation of polygon 702 has about a 50 mm diameter and a 24 mm height or less than 75 mm and less than 50 mm, respectively.

Mirror galvanometer 704 is positioned next to polygon 702 so that one or more signals emitted from light source output 706 (e.g., a fiber tip) reflect off of mirror galvanometer 704 and onto rotating polygon 702. Mirror galvanometer 704 tilts so as to scan one or more signals from output 706 a direction different than the direction that polygon 702 scans signals (e.g., edges 704A and 704B tilt towards and away from polygon 702 about axis so as to scan pulses along a path that is parallel to the axis of rotation of polygon 702). In other example systems, other scanning optics besides a mirror galvanometer can be used in place of mirror galvanometer 704. One implementation of mirror galvanometer 704 (or a scanning optic) has about a 50 mm length and a 24 mm height or less than 75 mm and less than 50 mm, respectively.

In some examples, polygon 702 is responsible for scanning one or more signals in the horizontal direction of the LiDAR system and mirror galvanometer 704 is responsible for scanning one or more signals in the vertical direction. In some other examples, polygon 702 and mirror galvanometer 704 are configured in the reverse manner. While the example in FIG. 7 uses a mirror galvanometer, other components can be used in its place. For example, one or more rotating mirrors or a grating (with different wavelength pulses) may be used. The solid black line represents one example signal path through the signal steering system.

Light returned from signal scattering (e.g., when a light hits an object) within region 708 (indicated by dashed lines) is returned to rotating polygon 702, reflected back to mirror galvanometer 704, and focused by lens 710 onto detector 712. While lens 710 is depicted as a single lens, in some variations it is a system of one or more optics.

Figure 8:
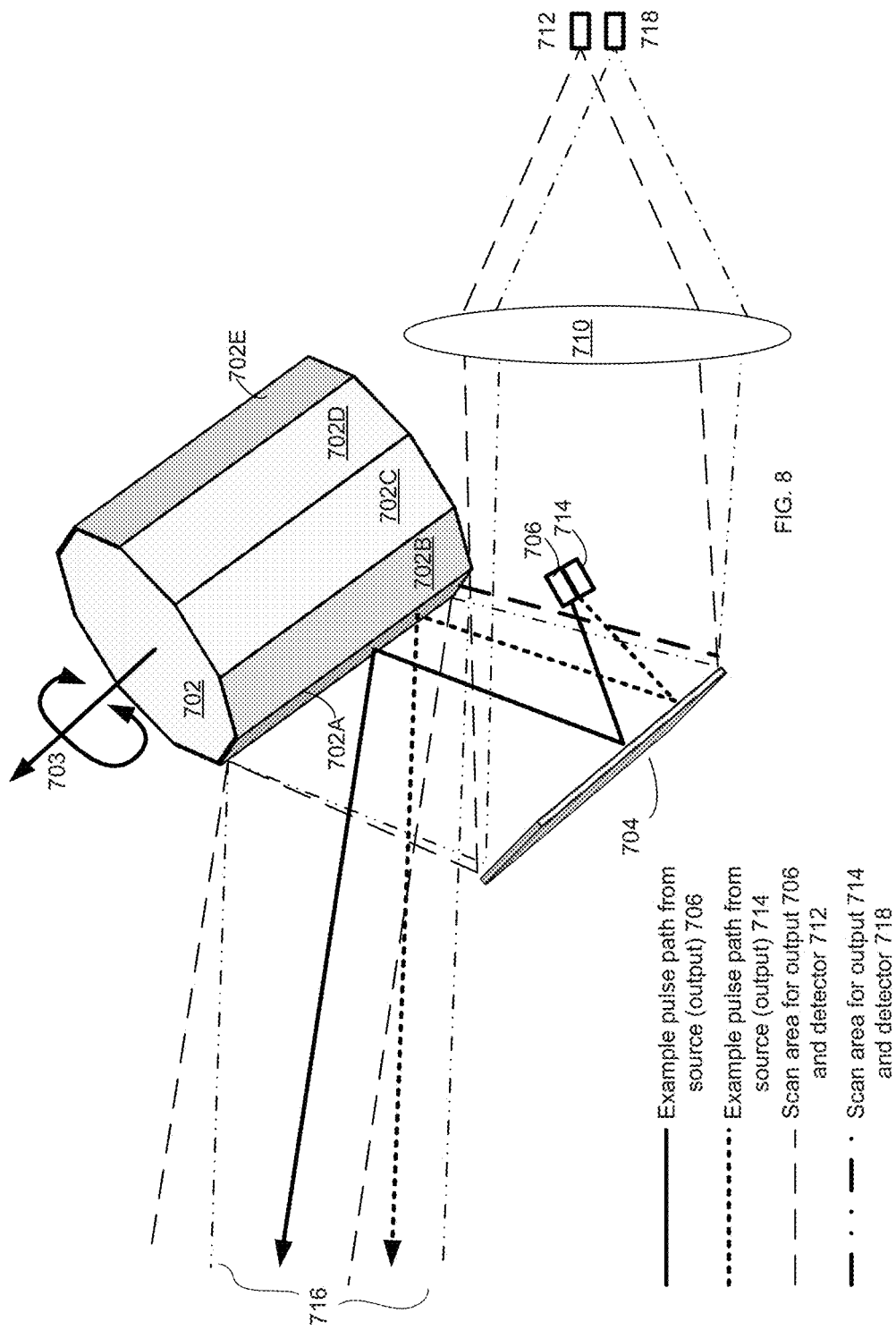
FIG. 8 depicts an embodiment of a signal steering system using two light sources and two detectors.

FIG. 8 depicts a similar system as depicted in FIG. 7 except a second light source is added that provides one or more signals from output 714. The light source for output 714 (e.g., an additional fiber tip) may be the same or different than the light source for output 706, and the light transmitted by output 714 may have the same or a different wavelength as the light transmitted by output 706. In one example system, a single 1 W laser source has enough power to support three outputs (e.g., three fiber tips) and additional outputs can be added by using a stronger laser source (e.g., a 4 W laser source). Using multiple light outputs can increase the points density of a points map without sacrificing the maximum unambiguous detection range of the system. For example, light output 714 can be positioned to transmit light at a different angle from output 706. Because of the different angles, light output from light output 706 is directed to an area different from light output from light output 714. The dotted line shows one example pulse path for pulses emitted from output 714. Consequently, one or more objects located at two different areas within a region can scatter and return light to the LiDAR system.

For example, the region 716 (the dashed/double-dotted line) indicates the region from which return signals from scattered signals returns to the LiDAR system. The returned light is reflected off polygon 702 and mirror galvanometer 704 and focused on detectors 712 and 718 by lens 710. Detectors 712 and 718 can each be configured to receive returned light from one of the outputs 706 and 714, and such configuration can be achieved by precisely controlling the position of the detectors 712 and 718 as well as the wavelength(s) of the transmitted light. Note that the same lens (or optic system) can be used for both detector 712 and 718. The offset (e.g., relative positions and/or relative angles) between outputs 706 and 714 causes the light returned to the LiDAR system to have a similar offset (e.g., similar relative positions and/or relative angles). By properly positioning detectors 712 and 718 based on the relative positioning and/or relative angles of their respect light source outputs (e.g., respective positions/angles of outputs 706 and 714) and by properly controlling the wavelength(s) of the transmitted light, the returned light will be properly focused on to the correct detectors, and each received light pulse at each detector can be a point in the points map. Therefore, compared to the system with only one output 706, the system with two outputs can maintain the same pulse repetition rate and produce twice the number of points or reduce the pulse repetition rate by half and still produce the same number of points. As a non-limiting example, a system with two light outputs can reduce the pulse repetition rate from 1 MHz to 500 kHz, thereby increasing its maximum unambiguous detection range from 150 meters to 300 meters, without sacrificing points density of the resulting points map. In some embodiments, a pulse repetition rate of between 200 kHz and 700 kHz or between 200 kHz and 2 MHz is used.

Figure 9:
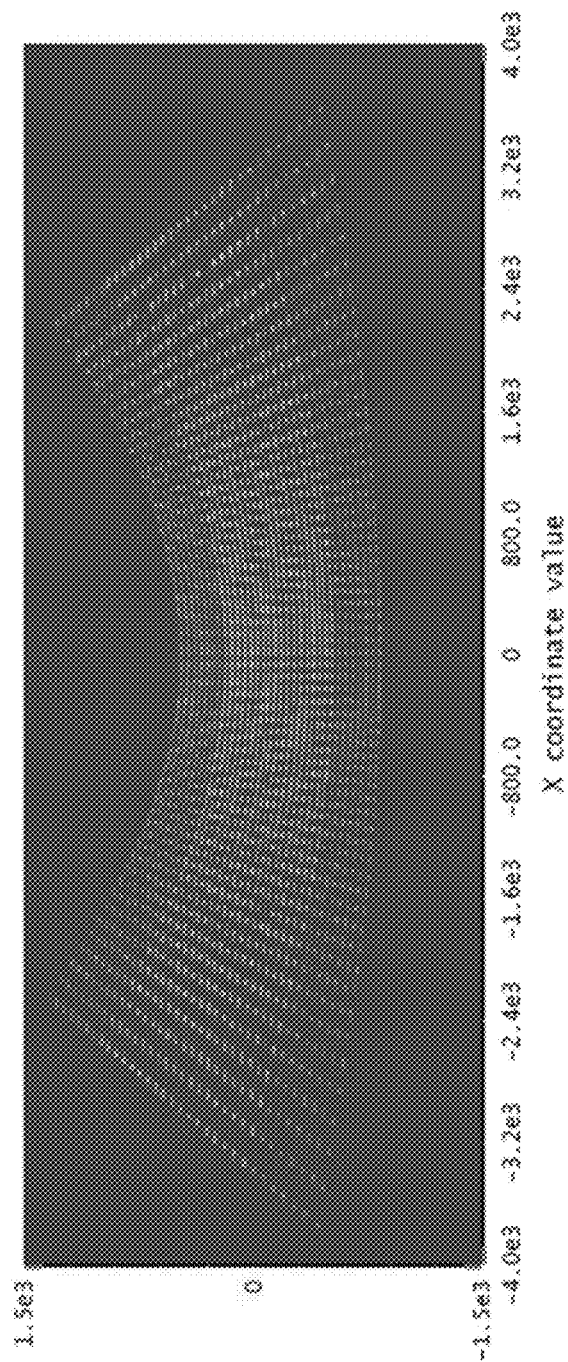
FIG. 9 depicts a portion of the scan pattern generated by the embodiment from FIG. 8.

FIG. 9 depicts a point map from a first design. This design has two channels (e.g., two light source outputs and two light detectors) placed in a way that the exiting beams have an angle of 8 degree vertically. The scanned pattern has vertical overlap. The scanned range is +−56 degree horizontally and +12~−20 degree vertically.

Figure 10:
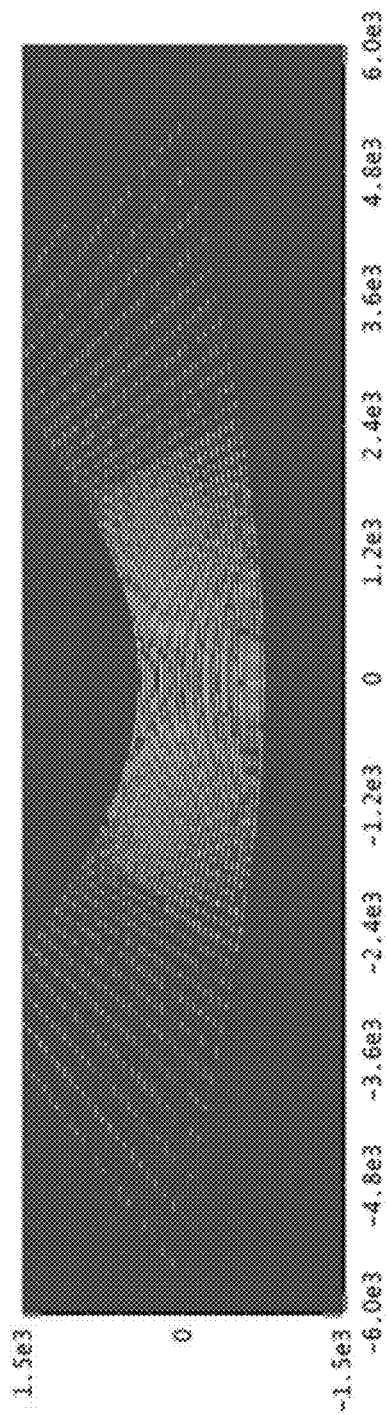
FIG. 10 depicts components for implementing another embodiment of a signal steering system using a dispersion optic to scan pulses in a direction.

FIG. 10 depicts a point map from a second design. This design has two channels (e.g., two light source outputs and two light detectors) placed in a way that the exiting beams have an angle of 6 degree vertically. The scanned pattern has horizontal overlap (+−45 degree). The scanned range is +−67 degree horizontally and +12~−20 degree vertically.

Figure 11:
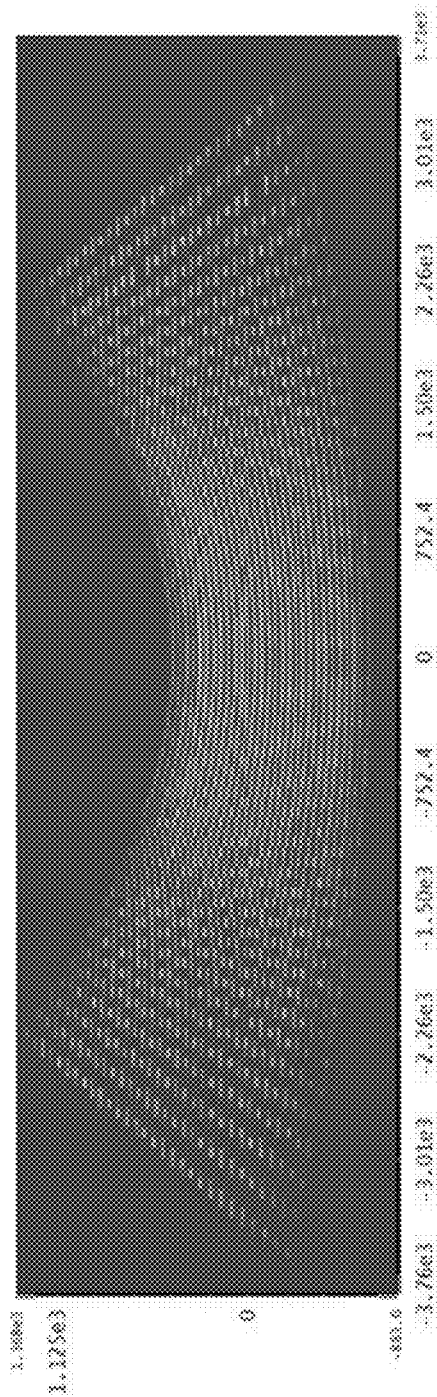
FIG. 11 depicts another embodiment of a signal steering system using three light sources and three detectors.

FIG. 11 depicts a point map from a third design. This design has three channels (e.g., three light source outputs and three light detectors) to increase point density. About 2.88 million points per second can be obtained by using 3 light source outputs and 3 light detectors. The resolution can be further reduced to 0.07 degree for both directions. The speed of the polygon can be reduced to 6000 rpm.

Various exemplary embodiments are described herein. Reference is made to these examples in a non-limiting sense. They are provided to illustrate more broadly applicable aspects of the disclosed technology. Various changes may be made and equivalents may be substituted without departing from the true spirit and scope of the various embodiments. In addition, many modifications may be made to adapt a particular situation, material, composition of matter, process, process act(s) or step(s) to the objective(s), spirit or scope of the various embodiments. Further, as will be appreciated by those with skill in the art, each of the individual variations described and illustrated herein has discrete components and features which may be readily separated from or combined with the features of any of the other several embodiments without departing from the scope or spirit of the various embodiments.

The invention claimed is:

1. A light detection and ranging (LiDAR) system comprising:
   a light source configured to provide one or more first light signals and one or more second light signals;
   a rotatable polygon having a plurality of reflective sides including a first reflective side, the rotatable polygon being configured to scan the one or more first light signals and the one or more second light signals in a first direction;
   a scanning optic configured to scan the one or more first light signals and the one or more second light signals in a second direction different than the first direction;
   wherein the scanning optic is optically coupled to the rotatable polygon and the light source, the scanning optic being configured to direct the one or more first light signals along a first path from the light source to the rotatable polygon and to direct the one or more second light signals along a second path to the rotatable polygon, wherein the first path is different from the second path, the first path and the second path intersecting with the scanning optic substantially simultaneously; and
   one or more detectors configured to detect a first return light signal associated with a signal of the one or more first light signals and a second return light signal associated with a signal of the one or more second light signals,
   wherein a combination of the rotatable polygon and the scanning optic is configured to redirect both the first return light signal and the second return light signal to the one or more detectors.

2. The system of claim 1,
   wherein the one or more detectors comprise a first detector configured to detect the first return light signal and a second detector configured to detect the second return light signal.

3. The system of claim 2, further comprising one or more optics configured to focus the first return light signal on the first detector and focus the second return light signal on the second detector.

4. The system of claim 2, wherein a relative position or a relative angle of the first detector to the second detector is based on a relative position or a relative angle of the first path to the second path.

5. The system of claim 2, wherein the rotatable polygon and the scanning optic together scan the one or more first light signals into a first scan area and scan the one or more second light signals into a second scan area different than the first scan area.

6. The system of claim 5, wherein the first scan area and the second scan area partially overlap.

7. The system of claim 5, wherein the first scan area and the second scan area overlap in at least one scanning direction.

8. The system of claim 5, wherein the first scan area and the second scan area do not overlap.

9. The system of claim 2, wherein the rotatable polygon and the scanning optic together scan the one or more first light signals into a first scan area and scan the one or more second light signals into the first scan area.

10. The system of claim 2, wherein the one or more first light signals includes a first plurality of light pulses having a first pulse repetition rate, and the one or more second light signals includes a second plurality of light pulses having a second pulse repetition rate.

11. The system of claim 10, wherein the first pulse repetition rate is between 200 KHz and 2 MHz, and the second pulse repetition rate is between 200 KHz and 2 MHz.

12. The system of claim 10, wherein the first pulse repetition rate is about 500 KHz.

13. The system of claim 2, further comprising:
   an additional light source configured to direct one or more third light signals to one or more of the plurality of reflective sides of the rotatable polygon and the scanning optic; and
   a third detector configured to detect a third return light signal associated with a signal of the one or more third light signals, wherein one or more optics are further configured to focus the third return signal on the third detector.

14. The system of claim 1, wherein the scanning optic is a mirror galvanometer.

15. The system of claim 1, wherein the scanning optic is a rotating mirror.

16. The system of claim 1, wherein the scanning optic is a grating.

17. The system of claim 1, wherein the one or more first light signals comprise one continuous light signal or a plurality of light pulses.

18. The system of claim 1, wherein the first path and the second path both intersect with the first reflective side substantially simultaneously.

19. The system of claim 1, wherein each reflective side of the rotatable polygon is wedge-shaped.

20. The system of claim 1, wherein one or more of the plurality of reflective sides of the rotatable polygon are of a trapezoid shape.

21. A method performed by a light detection and ranging (LiDAR) system, comprising:
   providing, by a light source, one or more first light signals and one or more second light signals;
   scanning, by a rotatable polygon having a plurality of reflective sides, the one or more first light signals and the one or more second light signals in a first direction;
   performing, by a scanning optic, processes including:
      receiving the one or more first light signals and the one or more second light signals from the light source,
      directing the one or more first light signals along a first path and the one or more second light signals along a second path to one or more of the plurality of reflective sides of the rotatable polygon, wherein the first path is different from the second path, the first path and the second path intersecting with the scanning optic substantially simultaneously, and
      scanning the one or more first light signals and the one or more second light signals in a second direction different from the first direction; and
   redirecting, by a combination of the rotatable polygon and the scanning optic, both a first return light signal and a second return light signal to one or more detectors, the first return light signal is associated with a signal of the one or more first light signals and the second return light signal is associated with a signal of the one or more second light signals.

* * * * *